United States Patent [19]
Vindasius et al.

[11] 3,909,924
[45] Oct. 7, 1975

[54] METHOD OF FABRICATION OF SILICON PRESSURE TRANSDUCER SENSOR UNITS

[75] Inventors: Alfons Vindasius, Sunnyvale; William F. Hare, Portola Valley, both of Calif.

[73] Assignee: National Semiconductor Corporation, Santa Clara, Calif.

[22] Filed: Mar. 27, 1974

[21] Appl. No.: 455,050

[52] U.S. Cl. ............... 29/574; 29/580; 29/610 SG; 29/25.35
[51] Int. Cl.² .......................................... B01J 17/00
[58] Field of Search .... 29/580, 576, 25.35, 610 SG, 29/583, 594, 595, 574; 156/17

[56] References Cited
UNITED STATES PATENTS
3,160,539  12/1964  Hall ..................................... 156/17
3,757,414  9/1973  Keller .................................. 29/580

*Primary Examiner*—W. Tupman
*Attorney, Agent, or Firm*—Lowhurst, Aine & Nolan

[57] ABSTRACT

The method of forming silicon transducer sensors wherein a cavity is formed in the substrate of a semiconductor body, one wall of the cavity being a flexible diaphragm having a piezoresistor bridge formed therein, forming a backing plate of silicon for sealing to said body to form another wall of the cavity forming a thin layer of oxide over the surface of said backing plate which is to be sealed to said substrate, forming a plurality of ports extending into said backing plate and extending to said thin layer of oxide, thereby leaving small areas of said layer of oxide, sealing the backplate to said substrate under vacuum with said small areas of said layer of oxide forming a part of the wall of said associated cavities whereby the bridge may be electrically tested with said cavity under vacuum, and thereafter puncturing said small oxide layer areas to complete a port through said backing plate into said cavity.

3 Claims, 1 Drawing Figure

U.S. Patent   Oct. 7, 1975   3,909,924
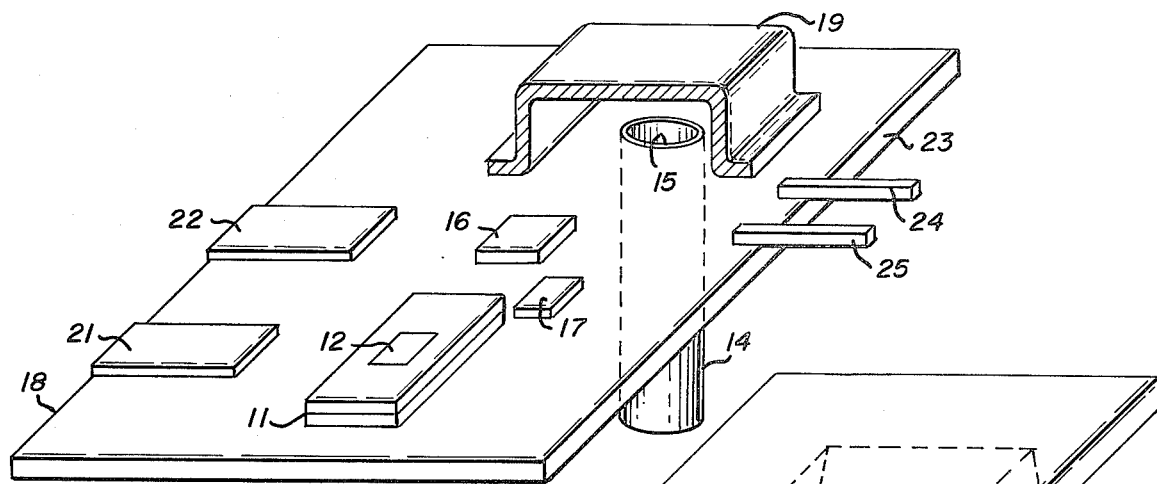
Fig_1
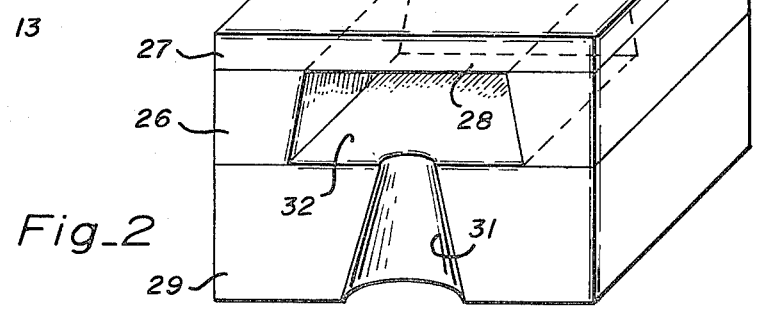
Fig_2
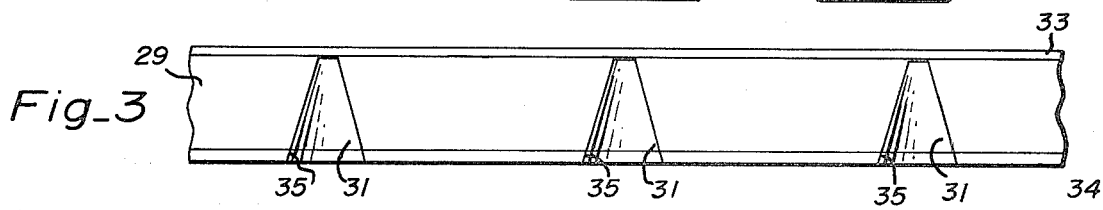
Fig_3
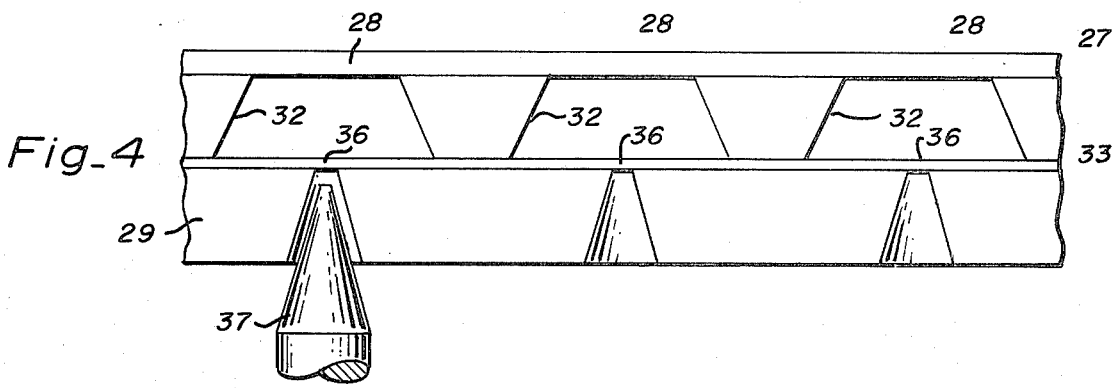
Fig_4
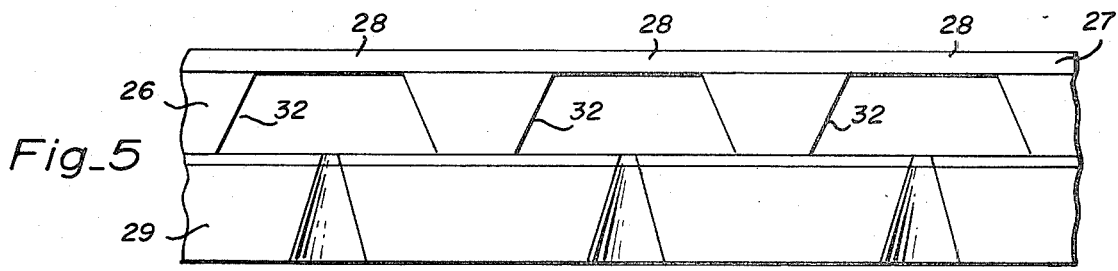
Fig_5

METHOD OF FABRICATION OF SILICON PRESSURE TRANSDUCER SENSOR UNITS

BACKGROUND OF THE INVENTION

Pressure transducers have been built utilizing semiconductor integrated circuitry. One such pressure transducer is described in an article entitled "Integration Brings a Generation of Low Cost Transducers" by A. Zias and W. Hare in "Electronics," Dec. 4, 1972, pages 83 to 88. Improved forms of such pressure transducers are shown and claimed in U.S. Pat. No. 3,836,796 issued on Sept. 17, 1974 under the names of James E. Solomon and Arthur R. Zias entitled "Semiconductor Pressure Transducer Employing Novel Temperature Compensation Means" and Ser. No. 399,937 filed Sept. 24, 1973 under the names of Richard J. Billette and John Vennard entitled "Semiconductor Pressure Transducer Employing Temperature Compensation Circuits and Novel Heater Circuitry."

One preferred form of the pressure transducer of the absolute pressure type comprises a 12 mil thick silicon chip having an 11 mil thick N+ type substrate and a 1 mil thick N epitaxial layer grown on the surface of the substrate. A vacuum reference cavity is formed in one portion of the chip by etching into the backside of the thick substrate to leave the thin wall diaphragm of the 1 mil thick N epitaxial layer.

This chip is bonded as by a heated glass frit while under a vacuum to a backplate or constraint wafer of silicon 12 mils thick, forming a pressure tight vacuum reference cell, the silicon pressure diaphragm forming one wall thereof.

A Wheatstone bridge arrangement of four piezoresistors is formed in the thin silicon diaphragm, the four resistors being formed by a P diffusion of boron into the N epitaxial layer grown on the silicon chip.

A constant voltage is applied to the pair of input nodes of the bridge, and the voltage output, which is linearly dependent on the pressure applied to the thin diaphragm to unbalance the bridge, is measured at the output node points of the bridge. As the pressure rises, the output voltage rises and thus serves as a measure of this pressure on the sensor, i.e., the resistor bridge on the semiconductor diaphragm.

In addition to the absolute pressure transducer which measures all pressure relative to a self-contained vacuum reference, gage pressure transducers (and differential pressure transducers) are also made by forming an opening through the backplate and into the cavity behind the silicon diaphragm, thus forming a gage or differential pressure transducer that measures a pressure point input relative to local ambient pressure or some known reference pressure.

These silicon pressure transducers are formed in multiple die form on a single wafer, for example 150 dice or more on each wafer. In the case of the absolute pressure transducer, each separate die may be electrically tested during the wafer processing and before the individual dice are separated from the main wafer. The Wheatstone bridge may be electrically tested since it is under pressure, the silicon diaphragm being flexed inwardly into the cavity due to the evacuated condition of the absolute pressure device. The electrical testing is carried out on the well known form of automatic X-Y stepping test prober which tests each die in turn, row by row, with the wafer being held in place under the automatic prober. Those individual dice that do not pass the electrical test are marked as by an ink dot so that, when the pressure transducer dice are finally separated apart, those dice not passing the electrical test may be discarded.

However, in the case of the gage or differential transducer, since there is a hole through the backplate into the cavity, the silicon diaphragm is not under pressure and not flexed. Therefore, electrical tests made to determine if the diaphragm will, in fact, respond to pressure cannot be carried out while testing the die in the wafer stage with the X-Y stepping probe tester. In such case it has been the practice to wait to conduct the electrical testing of the strain or flexing properties of the silicon diaphragm until the individual die had been separated from the wafer and subsequently formed into the complete transducer form on the mounting plate with other integrated circuits such as amplifiers used to form a complete pressure transducer device. Testing at this latter time in the fabrication process is substantially more costly than when the electrical test of the diaphragm is carried out while the multiple dice are in the single wafer state.

SUMMARY OF THE PRESENT INVENTION

The present invention provides a novel method of fabrication of a gage or differential type of pressure transducer whereby the electrical probe testing of the strain properties of the diaphragm of the die can be accomplished while the die is still in the wafer form. Thus, the electrical testing of the diaphragm of the gage or differential type silicon transducer takes place at the same stage in fabrication as the electrical testing of the absolute pressure transducer and, in fact, at this testing stage the transducer die is in the absolute pressure form. After the electrical testing, the silicon transducer die is readily converted from the absolute pressure type to the gage or differential pressure type. In this manner, gage or differential type pressure transducers with defective diaphragm stain characteristics due, for example, to a leak in the glass seal can be detected while still in the X-Y probe wafer testing stage.

In this novel technique, the backing plate is provided with a thin layer of silicon oxide over the entire top surface of the backing plate surface which is to be in sealed contact with the underside of the silicon body in which the cavity is formed. The underside of the backing plate is also provided with an oxide mask by standard photoresist technique, the mask forming a plurality of openings exposing the backing plate undersurface at each position where an opening is aligned with a cavity in the transducer silicon. The underside of the backing plate is then etched by an etchant that removes the silicon up to the thin oxide layer, small areas of the thin oxide layer then remaining at each cavity site, thereby forming a portion of a port or opening at each cavity site.

The silicon transducer wafer and the backing plate are then sealed together under vacuum with a sealant such as glass frit. The small area of silicon oxide layer in the cavity wall of each cavity in the silicon transducer body is able to withstand the vacuum pressure while the silicon diaphragm will flex inwardly as in the case of an absolute pressure cavity. Since the silicon cavity is in absolute pressure cavity form, the individual devices may be tested by the X-Y prober while in the wafer form.

After electrical probe testing, those silicon transducers that have good diaphragm strain characteristics can be separated out and thus converted to the gage transducer form by punching out the small oxide layer area in the backing plate and between the top surface of the backing plate and the underside of the transducer cavity. This forms a port or opening that exposes the cavity under the silicon diaphragm to the local ambient pressure and thus forms the desired gage or differential form of transducer.

BRIEF DESCRIPTION OF THE DRAWINGS

FIG. 1 is a perspective view of the pressure transducer apparatus fabricated in accordance with the present invention.

FIG. 2 is a cross-sectional view taken through the cavity portion of the semiconductor body included in the device of FIG. 1 showing the thin flexible diaphragm wall of the cavity and a port or opening in the back plate.

FIG. 3 is a cross-sectional view showing a portion of the backplate of three sensor devices formed at one stage in the fabrication in accordance with the present invention.

FIG. 4 is a cross-sectional view similar to FIG. 3 showing a portion of the device after electrical testing and prior to completion of the fabrication steps.

FIG. 5 is a cross-sectional view of a portion of the silicon wafer incorporating three of the multitude of transducer sensors fabricated as gage devices.

DESCRIPTION OF THE PREFERRED EMBODIMENTS

FIG. 1 illustrates the pressure transducer of known form including a semiconductor pressure sensor structure having a piezoelectric bridge 12 formed by the P diffusion of four resistor arms into the N epitaxial layer grown on an N+ substrate. The pressure sensor structure is affixed to a ceramic plate 13. A pressure tube connector 14 is sealed to the underside of the plate 13 and over an opening 15 in the plate 13 leading to the sensor region. The ceramic plate also has affixed thereto a buffer amplifier 16 (e.g., a 747 operating at unity gain) and e.g., a 741 operational amplifier 17 that raises the output signal received from the bridge 12 via the buffer amplifier 16 to the desired output level. A typical output voltage range is 2.5 to 12.5 volts for a pressure range from 0 to 30 psi.

The region of the plate 13 including the pressure tube hole 15 and the sensor structure 11 is covered by and sealed under a suitable metal cover 19. A number of thick film, trimmable resistors are positioned along one edge 18 of the ceramic plate 13 and outside of the evacuated cover region. Only two such resistors 21 and 22 are illustrated. Input and output terminal leads are positioned along the other edge 23 of the plate; only two such leads 24 and 25 are illustrated.

In FIG. 2 there is shown a cross-sectional view taken through the semiconductor body 11 which includes a N+ type substrate 26 about 11 mils thick in which a 1 mil thick N type epitaxial layer is grown. The N+ type material 26 under a central region of the wafer 26 is etched away to serve as the reference cavity, leaving only the 1 mil thick N epitaxial layer 27 in this region to serve as the diaphragm 28. Portions 26, 27 and 28 are of one single crystal of silicon. This upper semiconductor body portion 26, 27 and 28 is then sealed with a suitable bonding material under vacuum to a second semiconductor chip 29 which forms a backing plate for the upper semiconductor chip 26, 27 and 28. Where the pressure transducer is to serve as a gage or differential device rather than an absolute pressure transducer, a hole 31 is made through the backing chip 29 and extending into the cavity region 32 to expose the cavity region under the diaphragm 28 to the local ambient pressure. It should be noted that the structure shown is not drawn to scale; the semiconductor body including the top portion 26, 27 and 28 and the backing chip 29 is about .115 inch × .165 inch and about 24 mils thick. The cavity dimensions are about 11 mils thick and .060 inch × .115 inch.

In the prior art fabrication the holes or ports 31 were formed in the backplate 29 prior to electrical probe testing of the die on the wafer and, therefore, testing was performed with no strain on the diaphragm 28. Such electrical testing of the diaphragm was performed at a later stage in the fabrication of the pressure transducer of FIG. 2.

Referring now to FIG. 3, during an early stage in the process and, in accordance with the present invention thermal oxide layers 33 and 34 are formed on the upper and lower surfaces of the backing plate 29, respectively. Suitable sized apertures 35, e.g., 22 mils, are formed in the lower oxide surface 34 by the well known photoresist masking techniques, such apertures being spaced apart so as to be aligned with each cavity region. The silicon of plate 29 is then etched by an etchant such as hydrazine ($N_2H_4.H_2O$) which will etch out a port 31 in the silicon plate but will not attack oxide layer 33 which is about 8,000A thick. Therefore small areas, e.g., 2 mils diameter, of the oxide layer 33 will be left at each cavity region location.

As seen in FIG. 4, the backing plate 29 is then sealed as by fused glass frit and under a vacuum to the substrate 26 with the ports 31 in alignment with associated cavity regions 32.

There is thus formed a plurality of cavity regions, the diaphragms 28 forming one flexible wall thereof and the oxide layer areas 36 forming a portion of another wall. Because of the small size of the oxide layer areas 36, these small areas easily withstand the vacuum pressure. Therefore, absolute pressure cavities are formed and, since the diaphragms 28 are flexed or strained due to the evacuated condition of the cavity, the electrical tests may be conducted on the bridge circuits formed in the diaphragms 28 by X-Y stepping probe testers. All defective devices, such as those with leaks in the glass seal, are marked and weeded out.

At some later time, either after the wafer testing but prior to dividing the wafer into separate units or after separation but prior to assembly on a transducer unit, a needle or other form of punch 37 is used to punch through the layer areas 36 to complete the port or opening into the cavities. FIG. 5 illustrates a portion of the wafer after the ports have been completed and while the different dice are still in the wafer form.

Since the technique permits electrical testing of the strain properties of the diaphragms 28 while the devices are in wafer form, the yield factor is known at an early stage in the processing, thus leading to a considerable savings in the fabrication of the pressure transducers.

What is claimed is:

1. The method of forming semiconductor transducer sensors comprising the steps of:

forming a semiconductor layer on an upper surface of a semiconductor substrate, forming a plurality of spaced apart cavity regions in said substrate, said layer remaining to serve as flexible diaphragms for piezoresistor bridge circuits formed in each of said diaphragms, forming a backing plate of semiconductor material including forming an oxide layer on the upper surface of said backing plate, forming a plurality of spaced apart openings in the underside of the backing plate so as to be in alignment with the cavity regions in said substrate, said openings forming a portion of a port at each cavity region position, said ports stopping at the oxide layer formed on the upper surface of said backing plate, sealing the upper surface of said backing plate to said substrate under vacuum such that evacuated cavities are formed in said substrate, said cavities including said diaphragms as one wall of each cavity and said oxide layer in said ports serving as a portion of another wall of each cavity whereby absolute pressure sensor cavities are formed in the substrate, electrically testing the bridge circuits in the flexible diaphragms of the cavities, and thereafter converting said absolute pressure sensor cavities to ambient pressure sensor cavities by puncturing said oxide layers in said ports in said backing plate, thereby establishing a port opening into the associated cavity.

2. The method as claimed in claim 1 wherein the steps of forming the cavity regions in the substrate and forming the spaced apart openings in the underside of the backing plate comprise the steps of etching.

3. The method of forming semiconductor transducer sensors comprising the steps of:

forming a semiconductor layer on an upper surface of a semiconductor substrate, etching a plurality of spaced apart cavity regions into said substrate, said layer remaining to serve as flexible diaphragms for piezoresistor bridge circuits formed in each of said diaphragms, forming a backing plate of semiconductor material including forming an oxide layer on the upper and lower surfaces of said backing plate, forming a mask in the oxide layer of the underside of the backing plate, said mask having spaced apart openings therein so as to be in alignment with the cavity regions in said substrate, etching away the semiconductor material in said openings such that a portion of a port is formed at each cavity region position, said etched ports stopping at the oxide layer formed on the upper surface of said backing plate, sealing the upper surface of said backing plate to said substrate under vacuum such that evacuated cavities are formed in said substrate, said cavities including said diaphragms as one wall of each cavity and said oxide layer in said ports serving as a portion of another wall of each cavity whereby absolute pressure sensor cavities are formed in the substrate, electrically testing the bridge circuits in the flexible diaphragms of the cavities, and thereafter converting said absolute pressure sensor cavities to ambient pressure sensor cavities by puncturing said oxide layers in said ports in said backing plate, thereby establishing a port opening into the associated cavity.

* * * * *